Dec. 4, 1928.
F. GROTTS
1,694,035
TRACK LINK CONNECTION
Filed Feb. 18, 1925
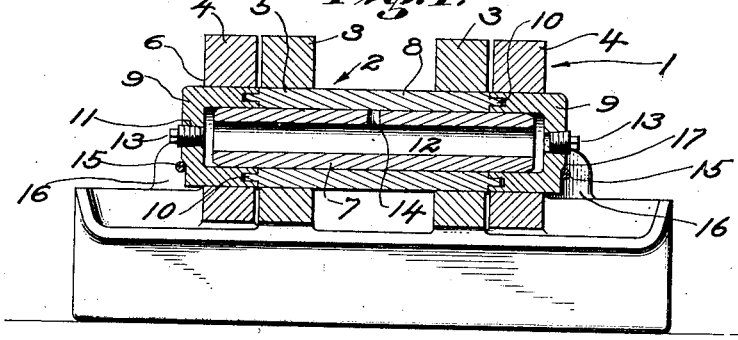
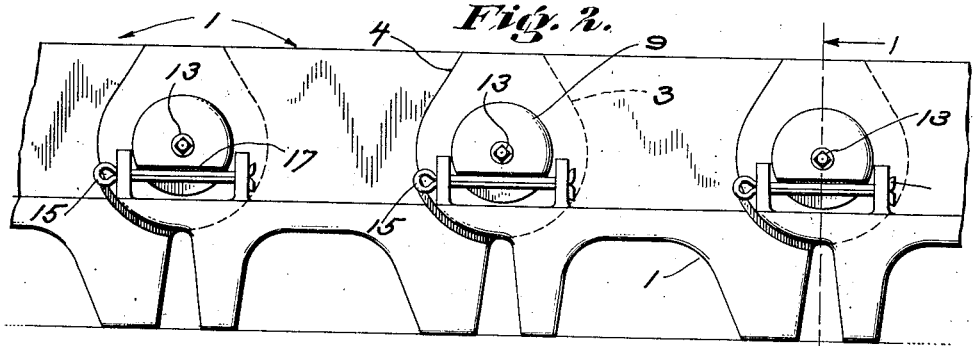
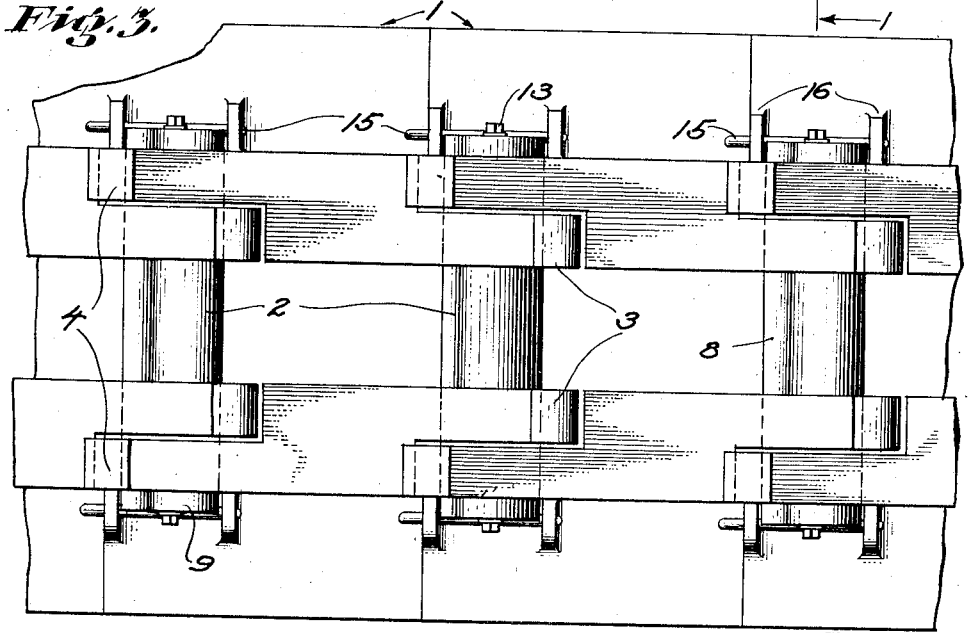
Inventor
Fred Grotts
By Dewey, Strong, Townsend & Loftus
Attorneys.

Patented Dec. 4, 1928.

1,694,035

UNITED STATES PATENT OFFICE.

FRED GROTTS, OF PEORIA, ILLINOIS, ASSIGNOR, BY MESNE ASSIGNMENTS, TO CATERPILLAR TRACTOR CO., A CORPORATION OF CALIFORNIA.

TRACK-LINK CONNECTION.

Application filed February 18, 1925. Serial No. 9,955.

This invention relates to improvements in endless tracks for tractors and particularly to an improved means for connecting the links of the track. Ordinarily these track links have been connected by solid one-piece pins or bolts extending through cooperating ears on the links whereby each link is pivotally joined to the next adjacent link. Such connection is inefficient for various reasons, particularly among which may be mentioned that the working parts thereof are open and entirely exposed to the entrance of dirt and abrasive material and such parts cannot be kept lubricated. It is the primary object of my invention to provide an improved connection, the working parts of which are tightly housed against the entrance of foreign matter and adapted to receive and hold grease therein for lubricating the same.

My invention particularly contemplates a compound track link connecting pin comprising a cylindrical pin member and parts cooperating therewith and with the links to be connected whereby, when assembled, the said compound pin and links will so closely and accurately cooperate that dirt cannot enter and the working parts will function with great ease and efficiency. Furthermore, the pin is provided with grease supplying and containing means whereby the parts may be kept lubricated. It is a further object of my invention to provide a compound connecting pin of this type.

In the accompanying drawing I have illustrated one specific embodiment of my invention but it will be understood that the invention can be otherwise embodied and that the drawing is not to be construed as defining or limiting the scope of the invention, the claims appended to this specification being relied upon for that purpose.

Referring to the figures of the drawing:

Fig. 1 is a longitudinal sectional view through my improved connection taken on line 1—1 of Fig. 2.

Fig. 2 is a side elevation of a portion of track connected by my improved pins.

Fig. 3 is a plan view thereof.

In the drawing, 1 indicates a plurality of track links connected by my improved compound pin 2. Each link is provided with a pair of inner connecting ears 3 at one end and a pair of outer connecting ears 4 at the opposite end. The inner ears of each link are adapted to be received within the outer connecting ears of the next adjacent link and the inner and outer ears are respectively provided with cooperating holes 5 and 6 therethrough for receiving the connecting pin.

My improved pin comprises a cylindrical pin member 7 on which is mounted a space block 8. This space black is of a length to fit within the holes 5 of the inner ears 3 and the block is made for a tight fit within such holes, as illustrated in Fig. 1. In the construction illustrated, the pin 7 projects beyond the ends of the block 8 and each projecting end thereof is adapted to receive a cap 9 thereover in the manner also illustrated in Fig. 1, the caps and block 8 being in end to end abutting relation. These abutting ends are preferably formed into a sealing joint, such as the labyrinth seal 10, illustrated in Fig. 1. The construction is such that the block 8 engages within the openings 5 of the inner ears and the caps 9 engage within the openings 6 of the outer ears 4.

The following construction provides for lubricating the pin connection. An opening 11 is formed through the end of each cap 9 through which grease can be supplied to a bore 12 within the pin 7, the openings 11 normally being closed by screw plugs 13. A radially extending opening 14 from the bore 12 serves to conduct grease to the bearing surface between the pin 7 and the block 8. The cap fits snugly within the openings 6 and are held in place by pins 15 extending through lugs 16 on the links and over the ends of the caps. The parts of the caps engaged by the pins are preferably chamfered off at 17 whereby the pins also hold the caps against rotation.

It will be understood that in operation the links pivot on each other about the connecting pins as the links pass over the sprocket wheels. The construction of the connecting pin is such as to permit this operation with the greatest ease and efficiency. The block 8 is floatingly mounted on the center pin 7. Also the block 8 engages and supports the inner ears and its link while the caps 9 engage and support the outer ears and its link. Thus, as the links pivot on the pin, the action will be to rotate the block 8 on the pin 7 or vice versa. This bearing and working surface between the pin 7 and block 8 is entirely housed and, therefore, always clean of any dirt or abrasive substance. Furthermore, the same can be lubricated by filling the bore 12 with grease through the openings 11.

It will be understood that the construction can be made and used with or without the lubricating feature, as desired. In either case the only working surfaces are between the pin 7, block 8 and end caps 9 and all abrasive is excluded whereby the life of the assembly is prolonged indefinitely.

Having thus described my invention, what I claim and desire to secure by Letters Patent is:

1. In combination, a pair of cooperating track links having respectively inner and outer pairs of ears for joining the links together, the inner pair of ears of one link being adapted to fit within the outer pair of ears of the other link and having registering bolt receiving openings therethrough, a cylindrical pin member within the registering openings, a space block floatingly mounted on the pin member and having its ends engaging within the openings in the inner pair of ears, and means on the ends of the pin member fitting within the holes on the outer ears and in abutting end relation with the space block.

2. In combination, a pair of cooperating track links having respectively inner and outer pairs of ears for joining the links together, the inner pair of ears of one link being adapted to fit within the outer pair of ears of the other link and having registering bolt receiving openings therethrough, a cylindrical pin member within the registering openings, a space block floatingly mounted on the pin member and having its ends engaging within the openings in the inner pair of ears, means on one end of the pin member fitting within the hole in one of the outer ears and in abutting end relation with the space block, and a removable cap on the other end of the pin member fitting within the hole in the other outer ear and in abutting end relation with the space block.

3. In combination, a pair of cooperating track links having respectively inner and outer pairs of ears for joining the links together, the inner pair of ears of one link being adapted to fit within the outer pair of ears of the other link and having registering bolt receiving openings therethrough, a cylindrical pin member within the registering openings, a space block floatingly mounted on the pin member and having its ends engaging within the openings in the inner pair of ears, the pin member having a grease receiving opening longitudinally therethrough and a cooperating laterally extending opening to the space block, means on the ends of the pin member fitting within the holes in the outer ears and in abutting end relation with the space block, and cooperating means whereby grease can be supplied to the grease receiving opening and the interior bearing surfaces of the pin.

FRED GROTTS.